(12) United States Patent
Hong et al.

(10) Patent No.: US 9,041,666 B2
(45) Date of Patent: May 26, 2015

(54) TOUCH PANEL AND TOUCH INFORMATION DETERMINING METHOD OF TOUCH PANEL

(75) Inventors: Won-Ki Hong, Suwon-si (KR);
Seung-Ho Nam, Seongnam-si (KR);
Kang-Won Lee, Yuseong-gu (KR)

(73) Assignee: SAMSUNG DISPLAY CO., LTD. (KR)

( * ) Notice: Subject to any disclaimer, the term of this patent is extended or adjusted under 35 U.S.C. 154(b) by 477 days.

(21) Appl. No.: 13/403,317

(22) Filed: Feb. 23, 2012

(65) Prior Publication Data

US 2013/0063372 A1   Mar. 14, 2013

(30) Foreign Application Priority Data

Sep. 9, 2011   (KR) .......................... 10-2011-0092082

(51) Int. Cl.
*G06F 3/041* (2006.01)

(52) U.S. Cl.
CPC ............ *G06F 3/0416* (2013.01); *G06F 3/0414* (2013.01)

(58) Field of Classification Search
None
See application file for complete search history.

(56) References Cited

U.S. PATENT DOCUMENTS

| | | | |
|---|---|---|---|
| 5,241,308 A | 8/1993 | Young | |
| 7,538,760 B2 | 5/2009 | Hotelling et al. | |
| 2007/0171212 A1* | 7/2007 | Sakurai et al. | 345/177 |
| 2008/0030483 A1* | 2/2008 | Choo et al. | 345/173 |
| 2008/0296073 A1* | 12/2008 | McDermid | 178/18.05 |
| 2010/0141576 A1* | 6/2010 | Jeong et al. | 345/157 |
| 2010/0315373 A1 | 12/2010 | Steinhauser et al. | |
| 2011/0069026 A1 | 3/2011 | Chen et al. | |
| 2011/0096019 A1 | 4/2011 | Tsai et al. | |
| 2011/0128257 A1* | 6/2011 | Kim | 345/175 |

FOREIGN PATENT DOCUMENTS

| | | |
|---|---|---|
| EP | 2321833 A0 | 2/2010 |
| EP | 2320308 A1 | 5/2011 |
| JP | 2010186460 A | 8/2010 |
| JP | 2010257444 A | 11/2010 |
| KR | 1020100022748 A | 3/2010 |
| KR | 100972932 B | 7/2010 |
| KR | 1020110021389 A | 3/2011 |
| KR | 101033153 B | 4/2011 |
| KR | 1020110034862 A | 4/2011 |
| WO | 2010015749 A1 | 2/2010 |

* cited by examiner

*Primary Examiner* — Nicholas Lee
(74) *Attorney, Agent, or Firm* — Cantor Colburn LLP

(57) ABSTRACT

A touch panel and a contact information determining method of the touch panel. A touch panel includes a plurality of transmitting members arranged with a predetermined interval therebetween, and a first sensor and a second sensor positioned respectively at a first terminal and a second terminal of a transmitting member, wherein a transmission signal is transmitted to the first sensor and the second sensor, in response to a contact on the transmitting member.

18 Claims, 18 Drawing Sheets

TOUCH PANEL AND TOUCH INFORMATION DETERMINING METHOD OF TOUCH PANEL

This application claims priority to Korean Patent Application No. 10-2011-0092082, filed on Sep. 9, 2011, and all the benefits accruing therefrom under 35 U.S.C. §119, the content of which in its entirety is herein incorporated by reference.

BACKGROUND OF THE INVENTION (1) Field of the Invention

The disclosure relates a touch panel and a contact information determining method of a touch panel.

(2) Description of the Related Art

Various display devices such as, for example, a liquid crystal display, an organic light emitting device, an electrophoretic display, a portable transmission device, or other information processing device may receive information by using various input devices. Recently, a touch panel has been widely used as the input device.

The touch panel may obtain contact information such as an occurrence of a contact event, a contact position, and a contact pressure applied to the touch panel when a physical object such as, for example, a finger or a touch pen (or stylus) contacts a touch screen. A desired command may be generated to operate a machine such as, for example, a computer, by touching the touch panel attached to the display device. Specifically, the desired command may be generated by writing characters, drawing symbols or clicking an icon on the touch panel using the physical object including the finger or the touch pen (or stylus).

A method of obtaining the contact information through the touch panel may include a resistive type, a capacitive type, an electro-magnetic ("EM") type, an optical type, or a pressure sensing type according to a touch sensing method of the touch panel.

Among the above methods, the pressure sensing type touch panel, which senses a pressure applied thereto by an external contact, may use a piezoelectric effect. The method using the piezoelectric effect uses a phenomenon in which an electrical resistance of a material is changed in response to a pressure applied thereto.

BRIEF SUMMARY OF THE INVENTION

An embodiment of the invention has made an effort to solve the above stated problems, and provides a touch panel that determines a contact position and contact intensity by a single or multiple touches.

An embodiment of the invention provides a touch panel having high transmittance.

An embodiment of the invention provides a touch panel having a reduced edge region and lower manufacturing cost.

An embodiment of the invention provides a touch panel capable of being applied to a flexible display device.

A touch panel according to an exemplary embodiment of the invention includes: a plurality of transmitting members arranged with a predetermined interval therebetween; and a first sensor and a second sensor positioned respectively at a first terminal and a second terminal of a transmitting member, wherein a transmission signal is transmitted to the first sensor and the second sensor, respectively, in response to a contact on the transmitting member.

The transmitting member may be flexible, and the transmission signal may comprise a material wave.

At least one of the first sensor and the second sensor may generate a sensing signal corresponding to a contact pressure.

At least one of the first sensor and the second sensor may include a reference resistor and a sensing resistor coupled in series between a first voltage and a second voltage, and the sensing signal may be output at a node between the reference resistor and the sensing resistor.

A resistance of the sensing resistor may be variable according to a magnitude of the transmission signal.

A magnitude of the sensing signal may be proportional to the magnitude of the transmission signal.

At least one of a number of a first sensing signal generated by the first sensor and a number of a second sensing signal generated by a second sensor may determine a number of a contact position to the touch panel, at least one of a temporal position of the first sensing signal and a temporal position of the second sensing signal may determine a coordinate of the contact position, and at least one of a magnitude of the first sensing signal and a magnitude of the second sensing signal and the coordinate of the contact position may determine a contact intensity. When it is determined that neighboring transmitting members are simultaneously contacted by the first and the second sensors of corresponding neighboring transmitting members, an average of coordinates of the corresponding transmitting members, each of which is determined based on the at least one of the temporal position of the first sensing signal and a temporal position of the second sensing signal may be output as the coordinate of the contact position.

The touch panel may further include a first support positioned at the first terminal of the transmitting member and positioned outwardly from the first sensor, and a second support positioned at the second terminal of the transmitting member and positioned outwardly from the second sensor.

The touch panel may further include a protection film positioned on the transmitting member.

The plurality of the transmitting members may be connected to each other alternately at a left terminal and a right terminal thereof.

The first sensor and the second sensor may be positioned at first or second terminal of first and second transmitting members connected to each other, the first transmitting member being positioned at a top portion and the second transmitting member being positioned at a bottom portion.

The touch panel may further include a wave absorption member positioned at the first and second terminals of each of the plurality of transmitting members.

The touch panel may further include an absorption member positioned between the plurality of the transmitting members.

According to an exemplary embodiment of the invention, provided is a method of determining contact information in a touch panel including a plurality of transmitting members that are arranged with a predetermined interval therebetween and a first sensor and a second sensor respectively positioned at a first terminal and a second terminal of a transmitting member, the method including: sensing a transmission signal transmitted by the transmitting member, using the first sensor and the second sensor, respectively; and generating a first sensing signal and a second sensing signal based on the sensed transmission signal.

The method may further include: determining a number of a contact position on the transmitting member based on the first sensing signal and the second sensing signal; determining a coordinate of the contact position by using a temporal position of the first sensing signal and a temporal position of the second sensing signal; and determining contact intensity based on at least one of a magnitude of the first sensing signal and a magnitude of the second sensing signal and the coordinate of the contact position.

When the number of the contact position is at least two, the determining of the coordinate of the contact position may include respectively calculating a coordinate of at least two contact positions.

When the number of the contact position is at least two, the determining of the coordinate of the contact position may include: calculating a coordinate of a reference position among at least two contact positions; and calculating a distance between the reference position and other contact position among the at least two contact positions.

The method may further include determining a first axis coordinate of a contact position based on a temporal position of the first sensing signal and a temporal position of the second sensing signal, and determining a second axis coordinate of the contact position based on a position of the transmitting member where the transmission signal is generated.

When it is determined that neighboring transmitting members are simultaneously contacted, an average of coordinates of corresponding transmitting members may be output as a coordinate of the contact position.

According to an exemplary embodiment of the invention, provided is a method of determining a contact position in a touch panel including a plurality of transmitting members, each of which extending in a first direction and being arranged in a second direction to have a predetermined interval therebetween, and a sensor positioned at each transmitting member, the method including: measuring a time period required for a touch signal to reach the sensor, wherein the touch signal is generated in response to a contact pressure applied to a transmitting member; determining a first coordinate of the contact position along the first direction based on the measured time period, wherein the sensor is a reference point for the first coordinate; determining a second coordinate of the contact position based on a position, along the second direction, of the transmitting member to which the contact pressure is applied.

According to exemplary embodiments of the invention, regardless of the number of contacts on the touch panel, contact information such as contact position and contact intensity may be simply calculated. Also, the transmittance of the touch panel may be increased, the manufacturing cost may be reduced, and the edge region of the touch panel may be reduced. The touch panel according to the exemplary embodiments may be easily applied to a flexible display device.

BRIEF DESCRIPTION OF THE DRAWINGS

The above and other aspects, advantages and features of the invention will become more apparent by describing in further detail exemplary embodiments thereof with reference to the accompanying drawings, in which.

DETAILED DESCRIPTION OF THE INVENTION

Figure 1:
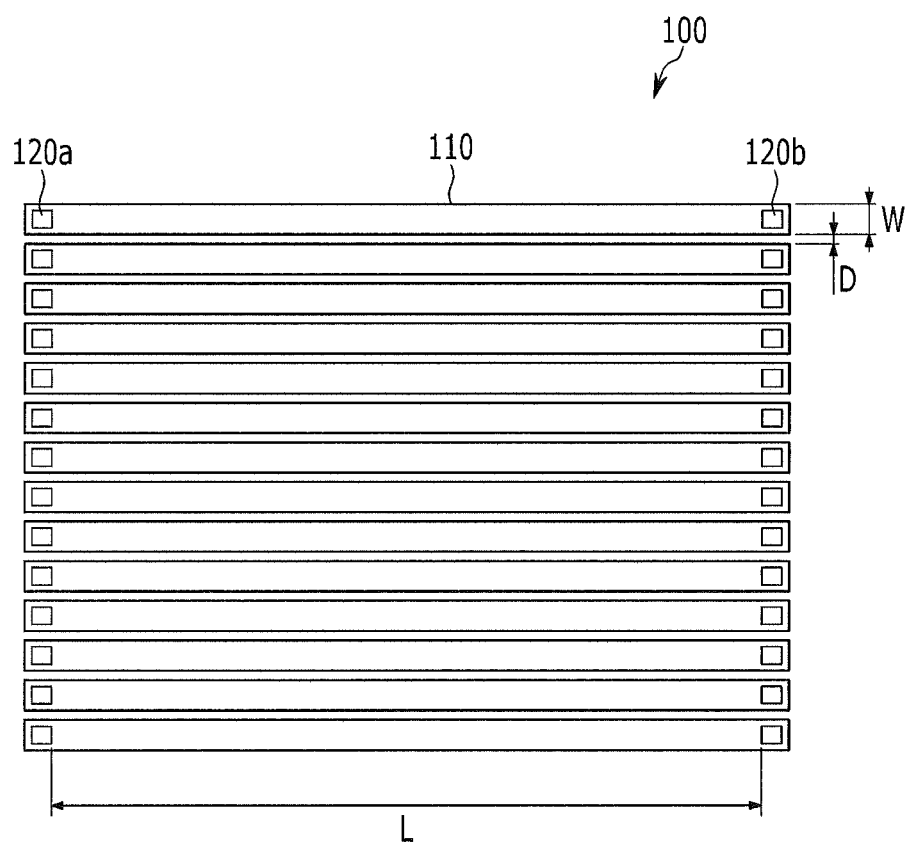
FIG. 1 is a top plan view illustrating an exemplary embodiment of a touch panel according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in further detail with reference to the accompanying drawings.

First, a touch panel according to an exemplary embodiment of the invention will be described with reference to FIG. 1 and FIG. 2.

Figure 2:
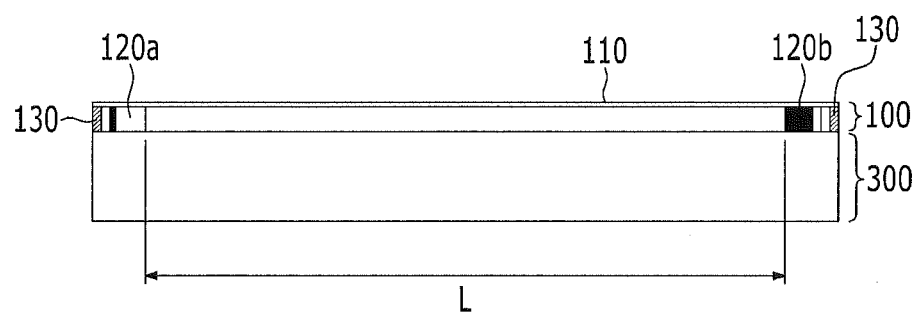
FIG. 2 is a cross-sectional view illustrating the touch panel shown in FIG. 1.

FIG. 1 is a top plan view illustrating an exemplary embodiment of a touch panel according to the invention, and FIG. 2 is a cross-sectional view illustrating the touch panel shown in FIG. 1.

Referring to FIG. 1 and FIG. 2, a touch panel 100 according to an exemplary embodiment of the invention may be a touch panel capable of being attached to or installed in various display devices 300. The display device 300 may include, for example, a liquid crystal display, an organic light emitting device, an electrowetting display device, and an electrophoretic display. The display device 300 may be flexible. In FIG. 2, the touch panel 100 according to an exemplary embodiment of the invention is attached to a surface of the display device 300 on which an image is displayed; however, it should be noted that the invention is not limited to this example. In an alternative exemplary embodiment, the touch panel 100 may be installed inside the display device 300.

The touch panel 100 according to an exemplary embodiment of the invention includes a plurality of transmitting members 110, a plurality of supports 130, and a plurality of pairs of first sensors 120a and second sensors 120b.

The plurality of the transmitting members 110 may be arranged at a predetermined interval D among one another in a first direction, e.g., a longitudinal direction. Each transmitting member 110 is extended in a second direction, e.g., a transverse direction, which is substantially perpendicular to the first direction, and a width W of the transmitting members 110 in the first direction may be uniform. Accordingly, a pitch of the plurality of the transmitting members 110 may be uniform. The width W of the transmitting member 110 may be in a range between about 4 millimeters (mm) and about 8 mm, and the interval D between neighboring transmitting members 110 may be in a range between about 0 micrometer (μm) and about 150 μm. Specifically, the interval D between the neighboring transmitting members 110 may be in a range between about 50 μm and about 120 μm. A length of the transmitting member 110 in the second direction may be equal to or less than a length of the touch panel 100 in the second direction.

The transmitting member 110 may comprise a flexible material that can transmit a wave in response to an external contact. The wave transmitted by the external contact may be a material wave, and specifically, in an exemplary embodiment, it may be a transverse wave or a surface acoustic wave. The wave transmitted by the transmitting member 110 due to the external contact is hereinafter referred to as a transmission signal. A propagation speed of the transmission signal may be constant regardless of intensity of the external contact or interference between several waves. In order for the transmission signal to be easily identified and analyzed, it is preferable that the transmitting member 110 has a smaller density, thereby reducing the propagation speed of the transmission signal. The transmitting member 110 may be transparent.

Differently from FIG. 1, in an alternative embodiment, the plurality of the transmitting members 110 may be arranged in the transverse direction and each transmitting member 110 may be extended in the longitudinal direction.

A pair of the supports 130 are respectively positioned under a first terminal and a second terminal of each transmitting member 110 to support the transmitting member 110.

A pair of the first sensor 120a and the second sensor 120b are respectively positioned under the first terminal and the second terminal of the transmitting member 110 to sense the transmission signal transmitted by the transmitting member 110 and to process the sensed transmission signal to generate a sensing signal. The first and second sensors 120a and 120b may be positioned inwardly from the support 130. A distance L between the pair of the first sensor 120a and the second sensor 120b may be uniform.

According to an exemplary embodiment of the invention, the first sensor 120a and the second sensor 120b may be adhered to the display device 300 by using an adhesive; however, in an alternative exemplary embodiment, the first sensor 120a and the second sensor 120b may include an adhesion member such that an additional adhesive may be not required.

Figure 3:
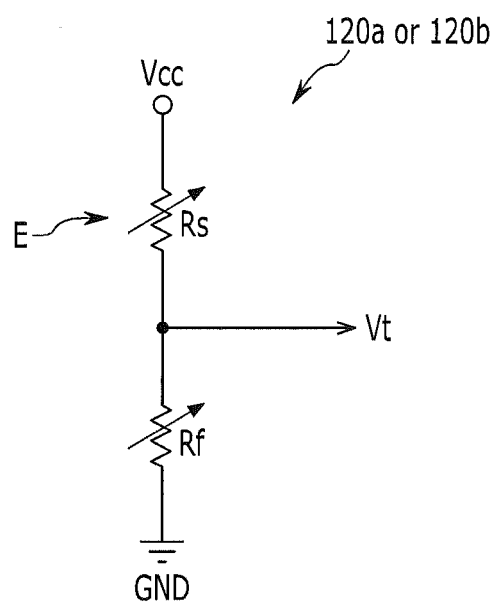
FIG. 3 is a circuit diagram illustrating an exemplary embodiment of a sensor of a touch panel according to the invention.

FIG. 3 is a circuit diagram illustrating an exemplary embodiment of a sensor of a touch panel according to the invention.

Referring to FIG. 3, the first sensor 120a and the second sensor 120b according to an exemplary embodiment of the invention may respectively include a reference resistor Rf and a sensing resistor Rs that are coupled in series between two constant voltage levels, for example, a reference voltage Vcc and a ground voltage GND. The reference resistor Rf may be a fixed resistor and the sensing resistor Rs may be a variable resistor. The sensing resistor Rs is connected to the reference voltage Vcc and the reference resistor Rf is connected to the ground voltage. A voltage at a node between the reference resistor Rf and the sensing resistor Rs is output as a sensing signal Vt. A value of the sensing signal Vt may be calculated by Equation 1, expressed as follows:

$$Vt=Vcc*(Rf/(Rf+Rs))$$ [Equation 1]

The sensing resistor Rs according to an exemplary embodiment of the invention may be of a pressure sensing type, and thus a resistance of the sensing resistor Rs may be changed according to a pressure level of the external contact. Specifically, if a pressure is exerted to the transmitting member 110 such that the transmission signal is generated and sensed by the first sensor 120a or the second sensor 120b, the resistance of the sensing resistor Rs may be changed accordingly. Here, the resistance of the sensing resistor Rs may be changed according to an energy of the transmission signal, that is, a magnitude E of the transmission signal. For example, when the magnitude E of the transmission signal is 0, that is, the pressure is not applied to the transmitting member 110 by the external contact, the resistance of the sensing resistor Rs may have a sufficiently high value (e.g., close to infinity). On the other hand, when the magnitude E of the transmission signal is increased, the resistance of the sensing resistor Rs is decreased accordingly. The sensing resistor Rs of the pressure sensing type may use a piezoelectric effect.

Accordingly, the value of the sensing signal Vt, represented by Equation 1, may be approximately proportional to the magnitude E of the transmission signal. In one exemplary embodiment, when the magnitude E of the transmission signal is zero, the sensing signal Vt may have a value that approximates zero. On the other hand, when the magnitude E of the transmission signal is increased, the sensing signal Vt may be increased accordingly. When the intensity of the external contact is large such that the magnitude E of the transmission signal is sufficiently large, the resistance of the sensing resistor Rs may become close to zero and the sensing signal Vt may be approximately equal to the reference voltage Vcc. Next, an operation method of the touch panel shown in FIGS. 1 through 3 according to the exemplary embodiment will be described with reference to FIGS. 4 through 7.

Figure 4:
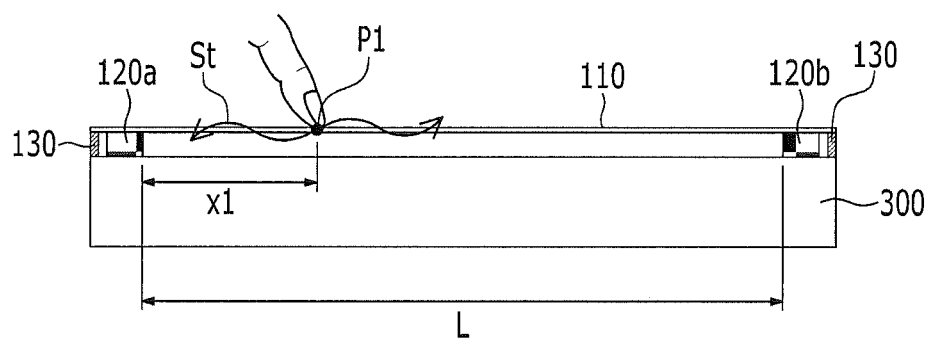
FIG. 4 is a cross-sectional view illustrating the touch panel shown in FIG. 2 when contacting one point of a transmitting member thereof.
Figure 5:
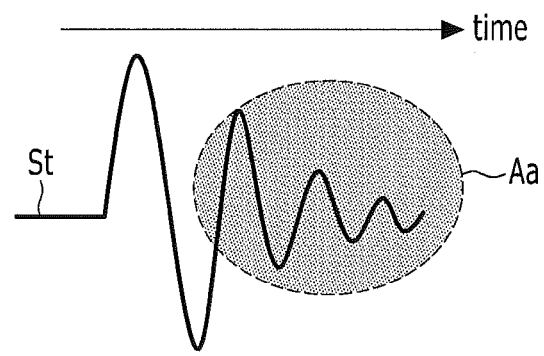
FIG. 5 is a waveform diagram illustrating an exemplary embodiment of a transmission signal transmitted through a transmitting member of a touch panel according to the invention.
Figure 6:
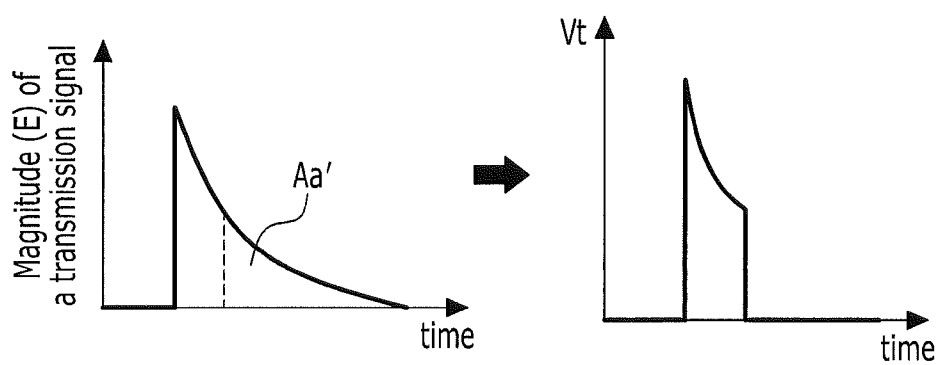
FIG. 6 is a graph illustrating a magnitude (Y-axis) versus time (X-axis) of the transmission signal shown in FIG. 5.
Figure 7:
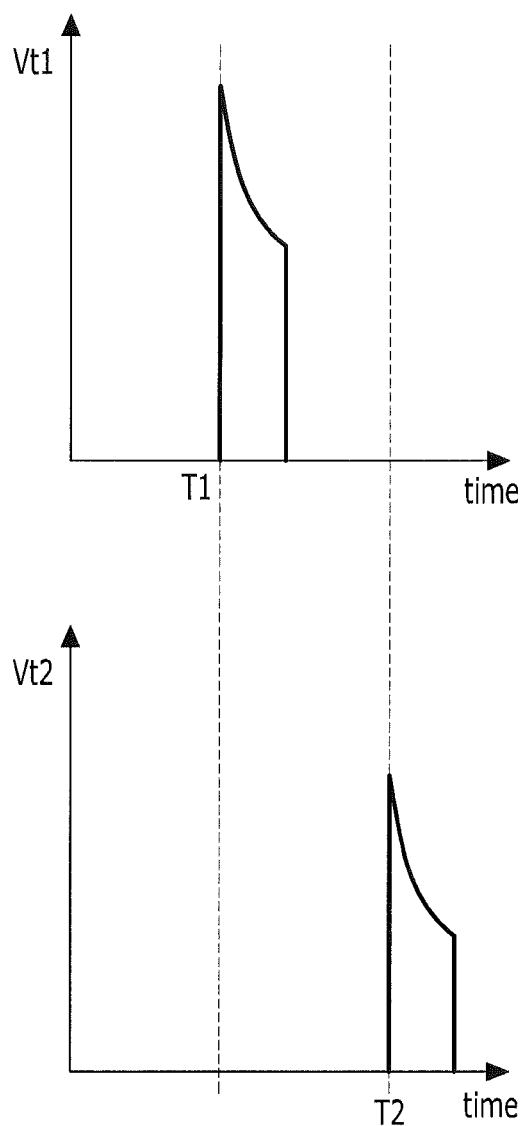
FIG. 7 is a graph illustrating an exemplary embodiment of a sensing signal (Y-axis) versus time (X-axis) of a touch panel according to the invention.

FIG. 4 is a cross-sectional view illustrating the touch panel shown in FIG. 2 when contacting one point of a transmitting member thereof, FIG. 5 is a waveform diagram illustrating an exemplary embodiment of a transmission signal transmitted through a transmitting member of a touch panel according to the invention, FIG. 6 is a graph illustrating a magnitude (Y-axis) versus time (X-axis) of the transmission signal shown in FIG. 5, and FIG. 7 is a graph illustrating an exemplary embodiment of a sensing signal (Y-axis) versus time (X-axis) of a touch panel according to the invention.

Referring to FIG. 4, the external contact is applied to a contact point P1 of the transmitting member 110 of the touch panel according to an exemplary embodiment of the invention, and the transmission signal St generated at the contact point P1 is propagated toward both sides of the transmitting member 110 to arrive at the first sensor 120a and the second sensor 120b. An arrival time of the transmission signal St at the sensors 120a and 120b may be changed according to respective distances from the contact point P1 to the first sensor 120a and the second sensor 120b.

Referring to FIG. 5 and FIG. 6, an amplitude of the transmission signal St is gradually decreased according to time or distance from the contact point P1, and accordingly, the magnitude E of the transmission signal St, which is proportional to a square of the amplitude of the transmission signal St, is also decreased according to time or distance from the contact point P1. As described above, the magnitude E of the transmission signal St may be approximately proportional to a magnitude of the sensing signal Vt that is output by the first and second sensors 120a and 120b.

The first and second sensors 120a and 120b respectively process the recognized transmission signal St to generate the sensing signal Vt. This processing may include filtering such that distinguishing the sensing signal Vt from the transmission signal St is easy. Specifically, through the filtering process, a partial attenuation region Aa of the transmission signal St shown in FIG. 5 may be filtered out. Accordingly, as shown in FIG. 6, an attenuation region Aa' in the graph showing the magnitude E of the transmission signal St is removed such that the sensing signal Vt having a pulse shape may be generated. A width of the removed attenuation regions Aa and Aa' shown in FIG. 5 and FIG. 6 may be appropriately controlled according to certain conditions of the touch panel. A temporal position of the sensing signal Vt generated through the filtering process may indicate a time point at which the pulse shape of the sensing signal Vt has a maximum peak value.

Referring to FIG. 7, it is considered that a temporal position T1 of the first sensing signal Vt1 output from the first sensor 120a is a time point at which the first sensor 120a recognizes the transmission signal St. Likewise, it is considered that a temporal position T2 of the second sensing signal Vt2 output from the second sensor 120b is a time point at which the second sensor 120b recognizes the transmission signal St.

The number of the first sensing signal Vt1 and the temporal position T1 thereof, and the number of the second sensing signal Vt2 and the temporal position T2 thereof may be changed according to the number of a contact and a contact position thereof on the corresponding transmitting member 110. When a plurality of contact positions exist on the transmitting member 110, the sensing signals Vt1 and Vt2 of the sensors 120a and 120b may be respectively in plural. Also, when the contact position of the transmitting member 110 is a center point between the first and second sensors 120a and 120b, the temporal position T1 of the first sensing signal Vt1 and the temporal position T2 of the second sensing signal Vt2 may be substantially the same. When the contact position of the transmitting member 110 is closer to the first sensor 120*a*, the temporal position T1 of the first sensing signal Vt1 may be positioned further left than the temporal position T2 of the second sensing signal Vt2 on the X-axis of time in the graph shown in FIG. 7.

The various contact information may be determined and obtained by using the numbers, temporal positions, and magnitudes of the sensing signals Vt1 and Vt2 of the first and second sensors 120*a* and 120*b*. One example of the contact information determining method according to the invention will be described with reference to FIG. 8 and FIG. 9.

Figure 8:
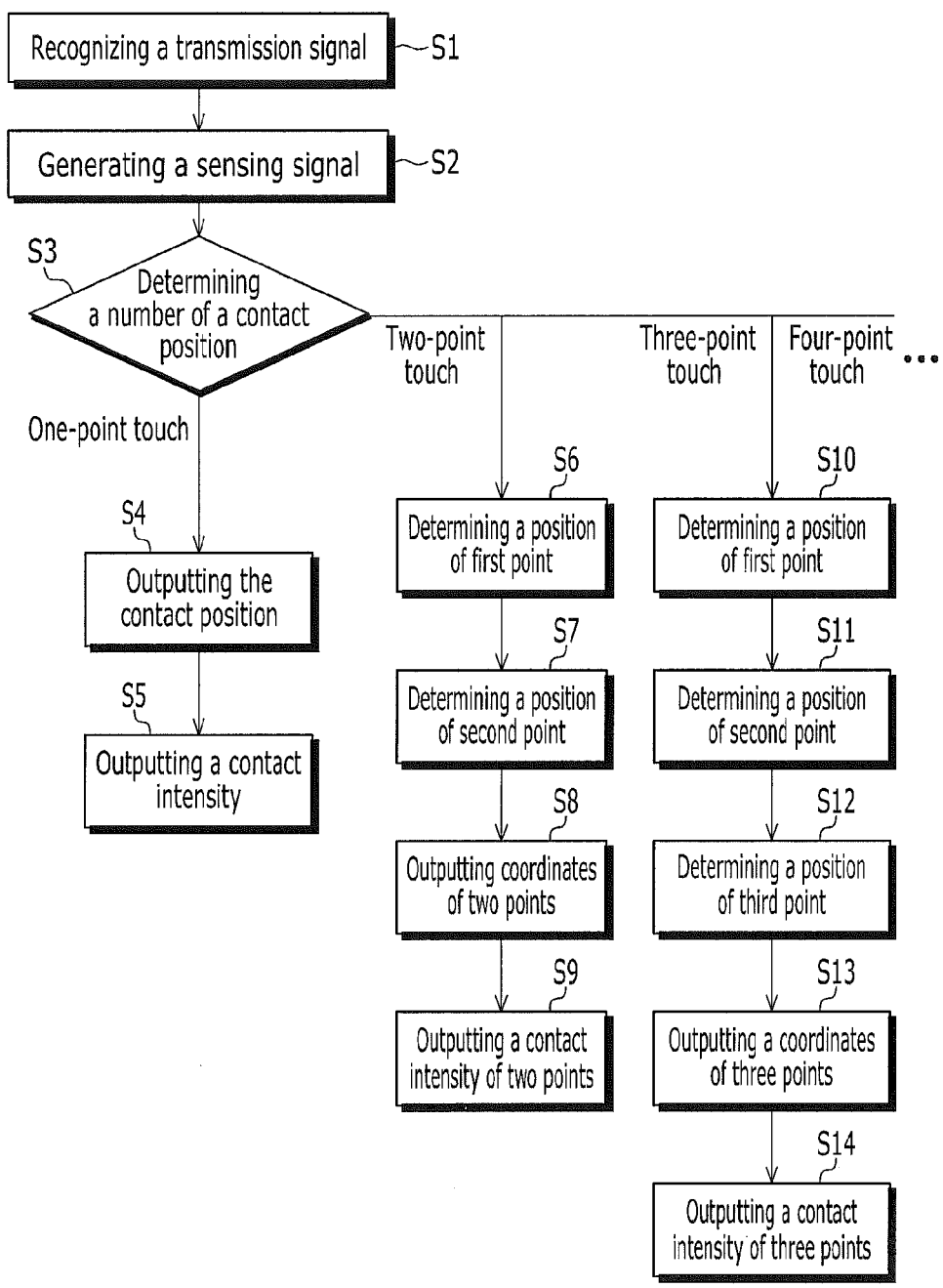
FIG. 8 and FIG. 9 are flowcharts illustrating an exemplary embodiment of an operation of a touch panel according to the invention.
Figure 9:
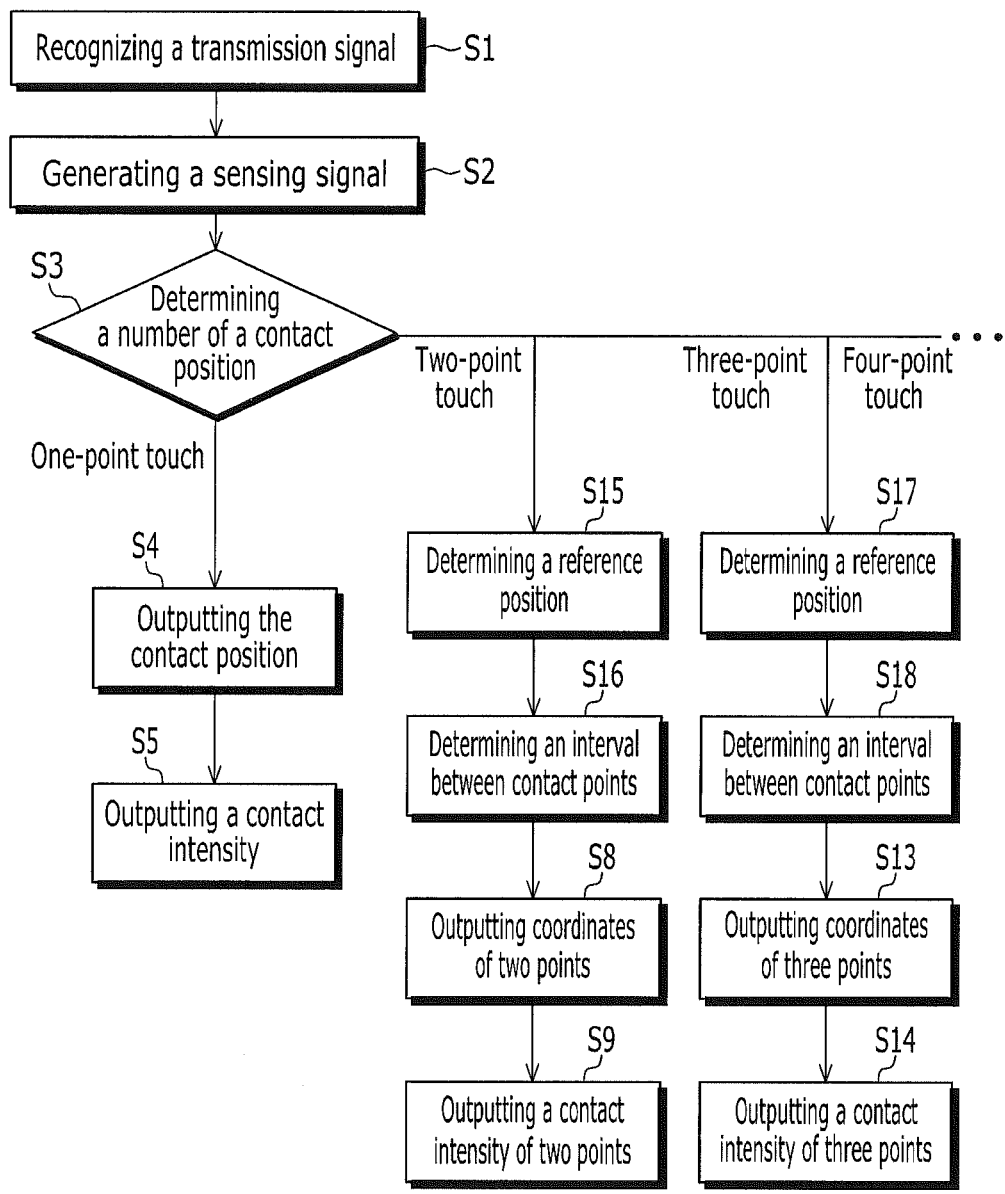

FIG. 8 and FIG. 9 are flowcharts illustrating an exemplary embodiment of an operation of a touch panel according to the invention.

Referring to FIG. 8, the first and second sensors 120*a* and 120*b* recognize a transmission signal St by a contact in the step S1. The first and second sensors 120*a* and 120*b* process the transmission signal St through, for example, filtering to generate the sensing signal Vt in step S2. The first and second sensors 120*a* and 120*b* determine the number of the contact position on the transmitting member 110 by using the processed sensing signal Vt in step S3. The number of the contact position on the transmitting member 110 may be determined based on the number of the sensing signals Vt generated by at least one of the first sensor 120*a* and the second sensor 120*b* connected to one transmitting member 110.

When the number of the contact position is one, the corresponding position, that is, coordinates of the contact position is calculated and output in step S4, and contact intensity thereof is calculated and output in step S5. A method of calculating the contact intensity will be described later. If the number of the contact position on the transmitting member 110 is two, contact positions of a first point and a contact position of a second point are detected in steps S6 and S7, coordinates of the two points are output in step S8, and contact intensities of the two points are output in step S9. Likewise, when the number of the contact position on the transmitting member 110 is three, contact positions of a first point, a second point, and a third point are detected in steps S10, S11, and S12, coordinates of the three points are output in S13, and contact intensities of the three points is output in step S14. As described above, when a plurality of contact positions exist on the transmitting member 110, coordinates of the plurality of the contact positions are output by detecting the contact position of each point and the contact intensity of each point may be calculated and output.

Next, referring to FIG. 9, the operation method of the touch panel according to the exemplary embodiment in FIG. 9 is similar to the exemplary embodiment shown in FIG. 8 except for a method of calculating the coordinates of each point. When the number of contact positions on the transmitting member 110 is two, one of the two points, which is determined as a reference position, is detected in the step S15. Here, the reference position may be determined as the contact point closest to a sensor, which is a reference point for an x coordinate. In one exemplary embodiment, the first sensor 120*a* may be the reference point for the x coordinate. Next, an interval between the reference position and another contact position in step S16, and the position of the two points, that is, the coordinates of the two points may be output in step S8, and the contact intensities of the two points may be output in step S9. Likewise, when the number of contact positions on the transmitting member 110 is three, one point of three points, which is determined as the reference position, is detected in the step S17, intervals between the reference position and the other two points are determined in step S18, the coordinates of the three points are calculated and output in step S13, and the contact intensities of the three points are output in step S14.

Next, a method of calculating the position, that is, the coordinates of the contact points, according to the number of the contact positions will be described in detail with reference to FIGS. 10 through 17 as well as the above-described drawings. Like reference numerals are used to refer to like elements throughout the drawings, and thus, a duplicate explanation thereof will be omitted.

Figure 10:
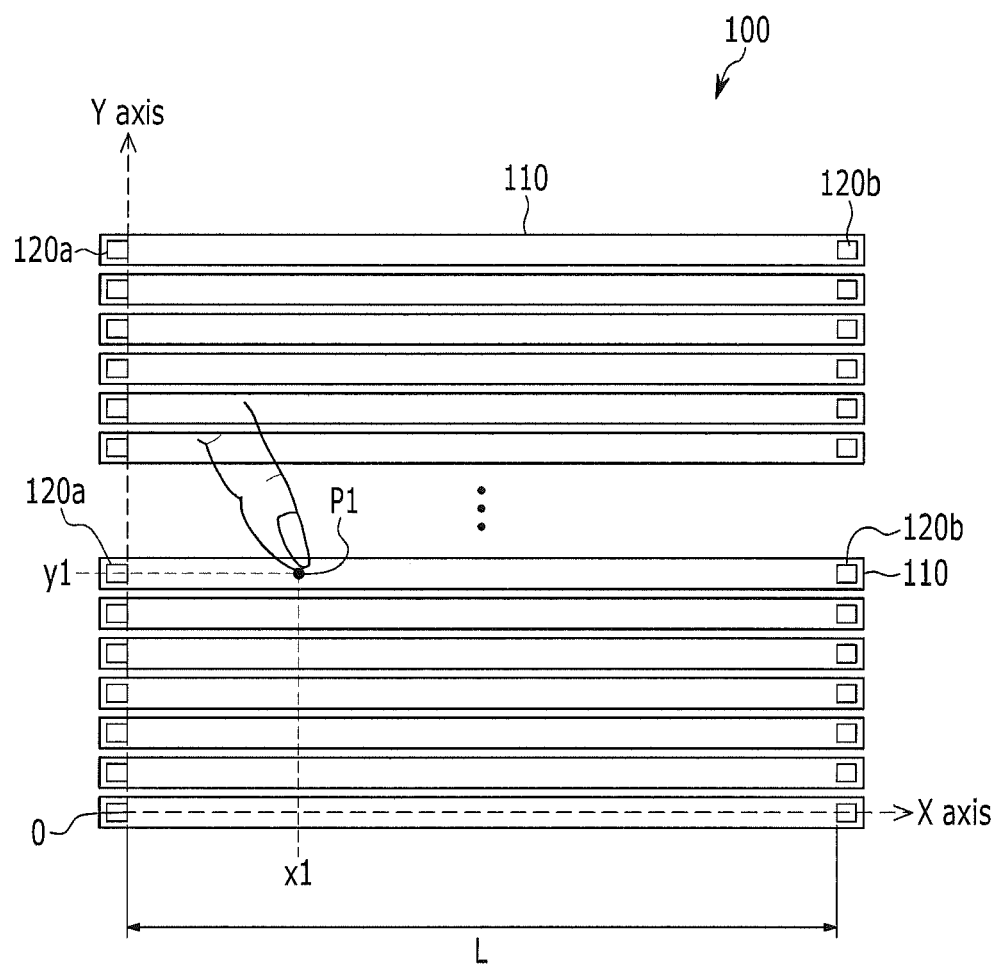
FIG. 10 is a top plan view illustrating an exemplary embodiment of a touch panel when contacting one point of a transmitting member thereof according to the invention.

FIG. 10 is a top plan view illustrating an exemplary embodiment of a touch panel when contacting one point of one transmitting member thereof according to the invention.

First, it is described a case in which the external contact is applied to a first contact point P1 on the transmitting member 110 of the touch panel 100 according to the exemplary embodiment shown in FIG. 1 and FIG. 2. Here, a pressure by the external contact on the first contact point P1 may also be applied to at least one other transmitting member 110.

The transverse direction in which the transmitting member 110 is extended is defined as an X-axis, and a direction in which the first sensors 120*a* are arranged, a direction which is substantially perpendicular to the X-axis, is defined as a Y-axis.

A first y coordinate y1 of the first contact point P1 may be determined as a position on the Y-axis of the corresponding transmitting member 110 to which a contact pressure is applied. For example, when the transmitting member 110 applied with the contact pressure is an n-th transmitting member 110 from a bottom, the first y coordinate y1 may be n or a value proportional thereto. Here, for example, a center of the width along the vertical direction of the transmitting member 110 may be used to determine the first y coordinate y1. Accordingly, a limit of error of the first y coordinate y1 of the corresponding transmitting member 110 may be ½ of the width W of the transmitting member 110.

A first x coordinate x1 of the first contact point P1 may be determined by a distance between the first sensor 120*a* and the first contact point P1 on the X-axis. A method of determining a reference point (i.e., origin) for the x and the y coordinates, described above, may be equally applied in the following description.

A method of calculating the first x coordinate x1 of the first contact point P1 will be described with reference to FIGS. 4, FIG. 7 and FIG. 10.

When the transmitting speed Vc of the transmission signal St is constant, the first x coordinate x1 of the first contact point P1 may be calculated by Equation 2, expressed as follows:

$$x1 = \frac{1}{2}(L - Vc|T2 - T1|) \quad \text{[Equation 2]}$$

In Equation 2, L is a distance between the first sensor 120*a* and the second sensor 120*b* of the transmitting member 110, Vc is a transmitting speed of the transmission signal St, T1 is a time point at which the first sensor 120*a* recognizes the transmission signal St, as shown in FIG. 7, or a time point at which the first sensing signal Vt1 is outputted, and T2 is a time point at which the second sensor 120*b* recognizes the transmission signal St, as shown in FIG. 7, or a time point at which the second sensing signal Vt2 is outputted. The same may be equally applied in the following description.

Figure 11:
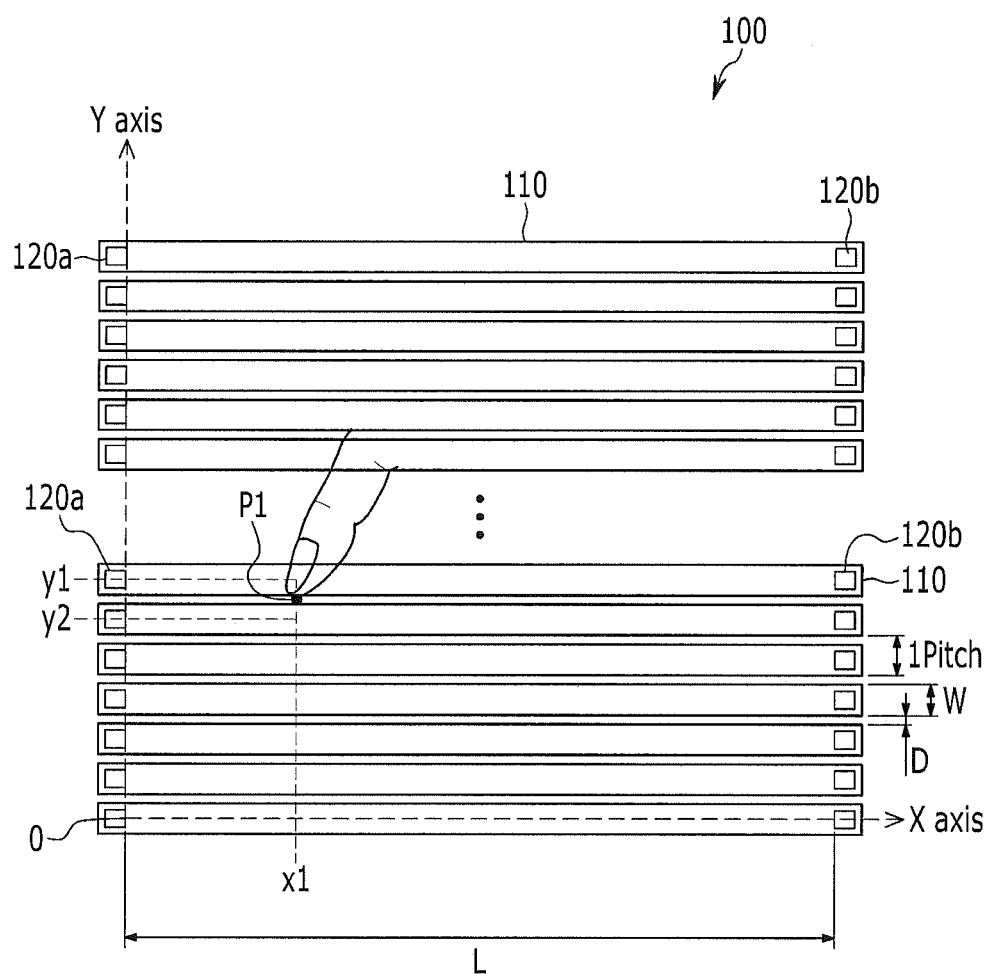
FIG. 11 is a top plan view illustrating an exemplary embodiment of a touch panel when contacting a point between two transmitting members thereof according to the invention.

FIG. 11 is a top plan view illustrating an exemplary embodiment of a touch panel when contacting a point between two transmitting members thereof according to an exemplary embodiment of the invention.

Referring to FIG. 11, the first contact point P1 is positioned between at least two neighboring transmitting members 110, and thus, the neighboring transmitting members 110 are simultaneously contacted, thereby transmitting the transmission signal St. Thus, at least two y coordinates, for example, y1 and y2, of the neighboring transmitting members 110 may be simultaneously output. In this case, to effectively minimize or prevent an erroneous detection that at least two points are contacted, an average of the at least two y coordinates, y1 and y2, is obtained and output as the y coordinate of one contact position such that it may be determined that only one contact point P1 is contacted.

Also, in this case, the contact positions of the neighboring contact members 110 may have one first x coordinate x1. When the contact positions of the neighboring contact members 110 have the same first x coordinate x1, it is output as the x coordinate for the determined contact position. When different x coordinates are recognized, the average of a plurality of x coordinates may be obtained, similar to calculating of the y coordinate described above, and output as the x coordinate of the corresponding contact position.

Accordingly, although two neighboring transmitting members 110 are contacted, it may be determined that one contact is applied. Accordingly, to determine at least two different contacts, the distance on the Y-axis of at least two different contact positions may be more than two times the pitch of the transmitting member 110.

Figure 12:
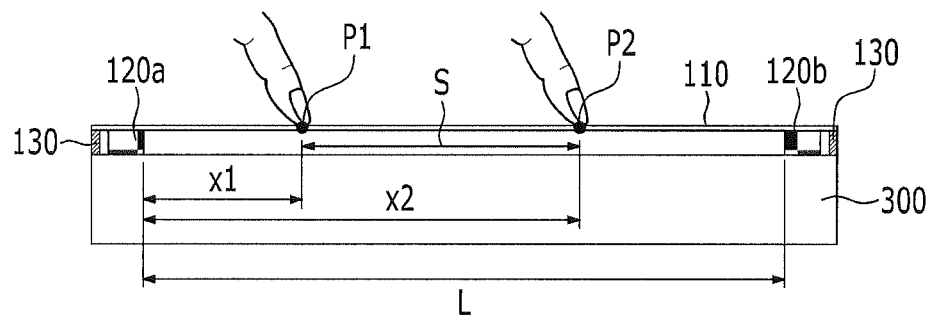
FIG. 12 is a cross-sectional view illustrating an exemplary embodiment of a touch panel when contacting two points of a transmitting member thereof according to the invention.
Figure 13:
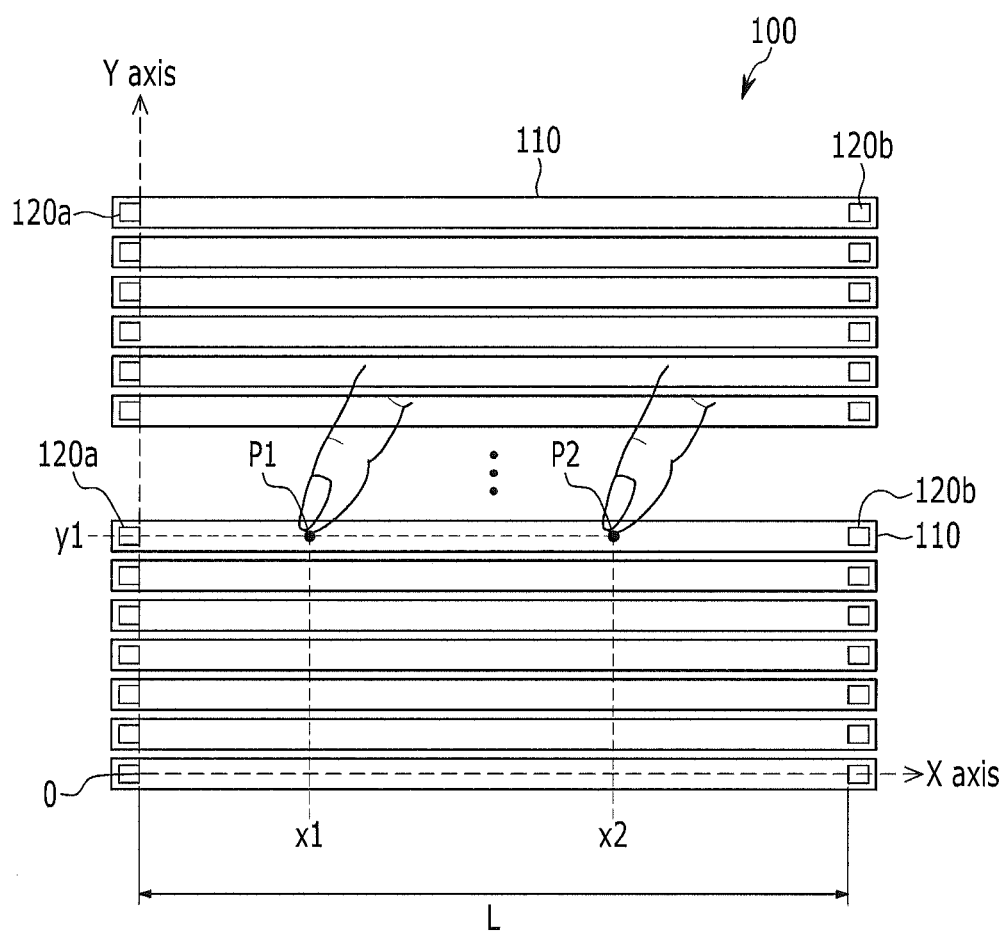
FIG. 13 is a top plan view illustrating an exemplary embodiment of a touch panel when contacting two points of a transmitting member thereof according to the invention.
Figure 14:
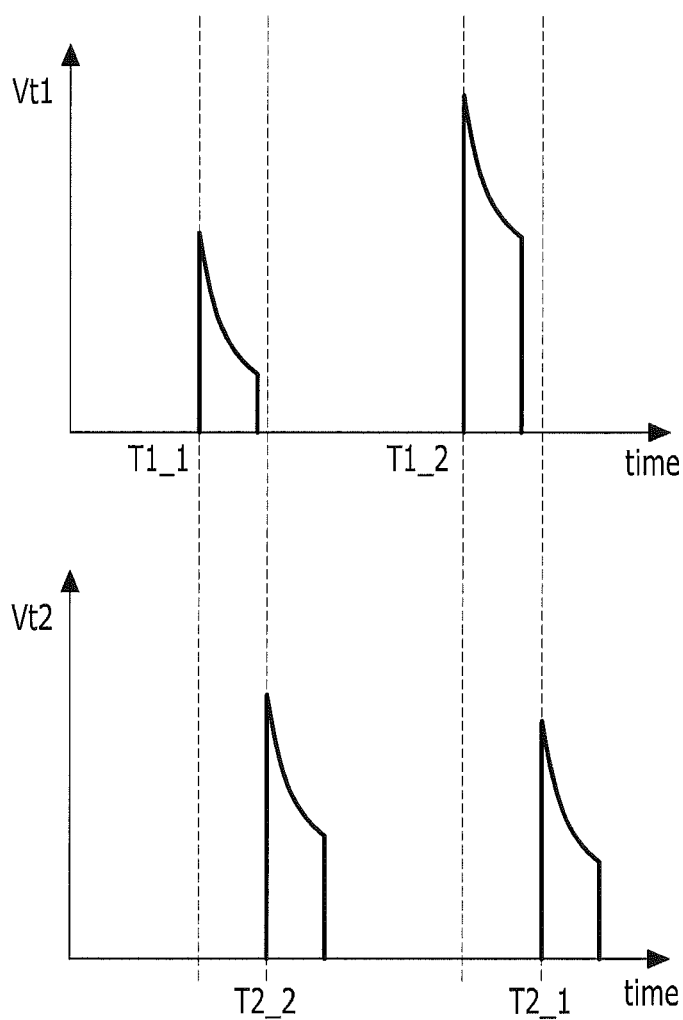
FIG. 14 is a graph illustrating an exemplary embodiment of a sensing signal (Y-axis) versus time (X-axis) when contacting two points of a transmitting member thereof according to the invention.

FIG. 12 is a cross-sectional view illustrating an exemplary embodiment of a touch panel when contacting two points of a transmitting member thereof according to the invention, FIG. 13 is a top plan view illustrating an exemplary embodiment of a touch panel when contacting two points of a transmitting member thereof according to the invention, and FIG. 14 is a graph illustrating an exemplary embodiment of a sensing signal (Y-axis) versus time (X-axis) when contacting two points of a transmitting member thereof according to the invention.

Referring to FIG. 12 and FIG. 13, two contact points P1 and P2 exist for one transmitting member 110, and when calculating the x coordinate relative to the first sensor 120a, a difference between the first x coordinate x1 of the first contact point P1 and the second x coordinate x2 of the second contact point P2 is referred to as S.

Referring to FIG. 14, a difference between a temporal position T1_1 of the first sensing signal Vt1 corresponding to the first contact point P1 of the first sensor 120a and a temporal position T1_2 of the first sensing signal Vt1 corresponding to the second contact point P2 of the first sensor 120a may be substantially equal to a difference between a temporal position T2_1 of the second sensing signal Vt2 corresponding to the first contact point P1 of the second sensor 120b and a temporal position T2_2 of the second sensing signal Vt2 corresponding to the second contact point P2 of the second sensor 120b.

The y coordinates of the first and second contact points P1 and P2 may be determined according to the method of the above-described exemplary embodiment.

The first x coordinate x1 of the first contact point P1 and the second x coordinate x2 of the second contact point P2 may be calculated by Equation 3, expressed as follows:

$$x1 = \tfrac{1}{2}(L - Vc|T2\_1 - T1\_1|)$$

$$x2 = \tfrac{1}{2}(L - Vc|T2\_2 - T1\_2|) \qquad [\text{Equation 3}]$$

Alternatively, after the first x coordinate x1 is calculated by using Equation 3 and the first contact point P1, which is closer to the first sensor 120a, that is, the reference point for the x coordinate, is determined as the reference position, the second x coordinate x2 of the second contact point P2 may be calculated by Equation 4, expressed below, by using the difference S between the first x coordinate x1 of the first contact point P1 and the second x coordinate x2 of the second contact point P2.

$$S = |T1\_1 - T1\_2| * Vc$$

$$x2 = x1 + S \qquad [\text{Equation 4}]$$

Figure 15:
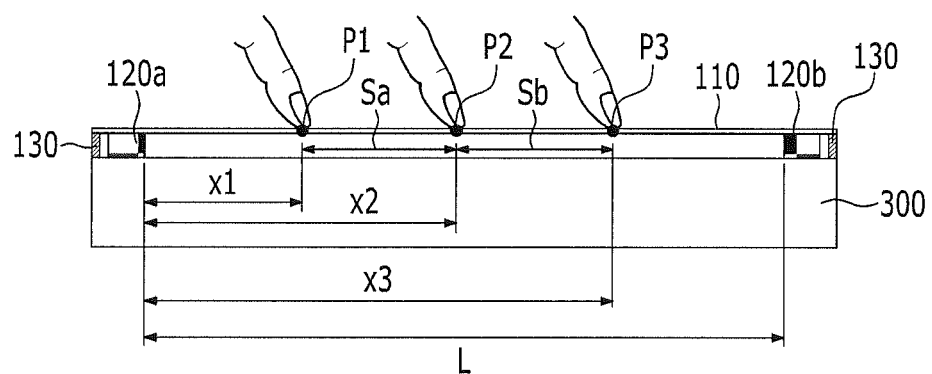
FIG. 15 is a cross-sectional view illustrating an exemplary embodiment of a touch panel when contacting three points of a transmitting member thereof according to the invention.
Figure 16:
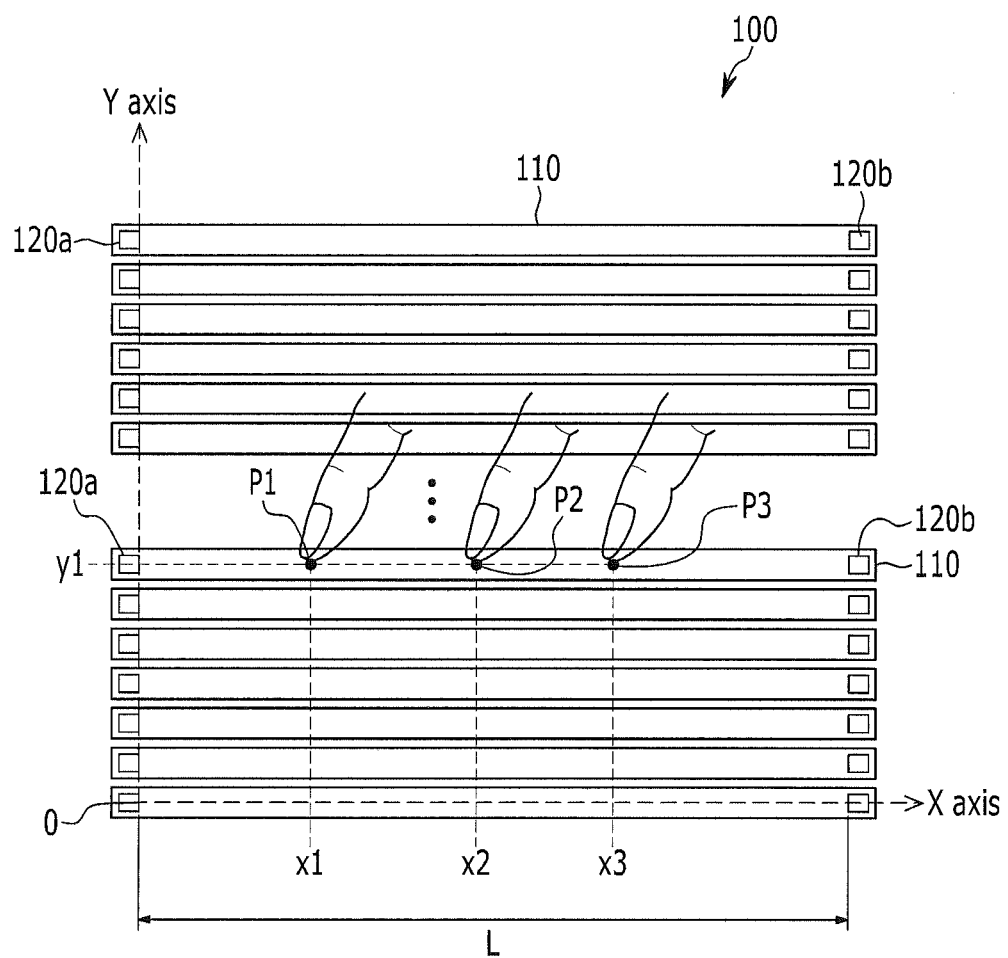
FIG. 16 is a top plan view illustrating an exemplary embodiment of a touch panel when contacting three points of a transmitting member thereof according to the invention.
Figure 17:
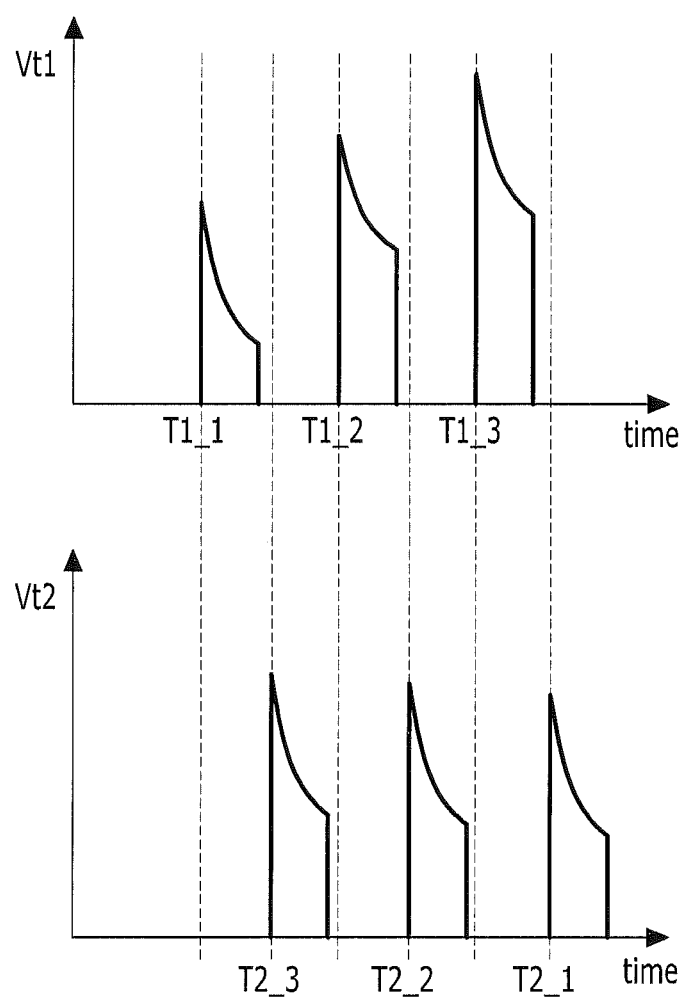
FIG. 17 is a graph illustrating an exemplary embodiment of a sensing signal (Y-axis) versus time (X-axis) when contacting three points of a transmitting member of a touch panel according to the invention.

FIG. 15 is a cross-sectional view illustrating an exemplary embodiment of a touch panel when contacting three points of a transmitting member thereof according to an exemplary embodiment of the invention, FIG. 16 is a top plan view illustrating an exemplary embodiment of a touch panel when contacting three points of a transmitting member thereof according to the invention, and FIG. 17 is a graph illustrating an exemplary embodiment of a sensing signal (Y-axis) versus time (X-axis) when contacting three points of a transmitting member of a touch panel according to the invention.

According to an exemplary embodiment of the invention, when at least three contact points P1, P2, and P3 on the transmitting member 110 exist, the coordinates of each contact point may be obtained by obtaining coordinates of the contact point, which is determined as the reference position, and the distance between the neighboring contact points.

Referring to FIG. 15 and FIG. 16, when calculating the x coordinate with reference to the first sensor 120a, the difference between the first x coordinate x1 of the first contact point P1 and the second x coordinate x2 of the second contact point P2 is referred to as Sa, and the difference between the second x coordinate x2 of the second contact point P2 and the third x coordinate x3 of the third contact point P3 is referred to as Sb.

Referring to FIG. 17, in accordance with the distance between the first sensor 120a and the three contact points P1, P2, and P3, a temporal position T1_1 of the first sensing signal Vt1 for the first contact point P1 of the first sensor 120a, a temporal position T1_2 of the first sensing signal Vt1 for the second contact point P2 of the first sensor 120a, and a temporal position T1_3 of the first sensing signal Vt1 for the third contact point P3 of the first sensor 120a may be in a sequential order with respect to time. Also, in accordance with the distance between the second sensor 120b and the three contact points P1, P2, and P3, a temporal position T2_3 of the second sensing signal Vt2 for the third contact point P3 of the second sensor 120b, a temporal position T2_2 of the second sensing signal Vt2 for the second contact point P2 of the second sensor 120b, and a temporal position T2_1 of the second sensing signal Vt2 for the first contact point P1 of the second sensor 120b may be in a sequential order with respect to time.

The y coordinate of the contact points P1, P2, and P3 may be determined by using the same method as in the above-described exemplary embodiment.

The first x coordinate x1 of the first contact point P1, the second x coordinate x2 of the second contact point P2, and the third x coordinate x3 of the third contact point P3 may be calculated by Equation 5, expressed as follows:

$$x1 = \tfrac{1}{2}(L - Vc|T2\_1 - T1\_1|)$$

$$x2 = \tfrac{1}{2}(L - Vc|T2\_2 - T1\_2|)$$

$$x3 = \tfrac{1}{2}(L - Vc|T2\_3 - T1\_3|) \qquad [\text{Equation 5}]$$

Alternatively, after the first x coordinate x1 is calculated by using Equation 5 and the first contact point P1, which is closest to the first sensor 120a, that is, the reference point for the x coordinate is determined as the reference position, the second x coordinate x2 of the second contact point P2 and the third x coordinate x3 of the third contact point P3 may be calculated by Equation 6, expressed below, by using the distances Sa and Sb between the contact points P1, P2, and P3.

$$Sa = |T1\_1 - T1\_2| * Vc$$

$$Sb = |T1\_2 - T1\_3| * Vc$$

$$x2 = x1 + S1$$

$$x3 = x2 + S2 \qquad \text{[Equation 6]}$$

It should be noted that the x coordinate of at least one contact position for the transmitting member 110 may be calculated through various calculation methods other than the method described above.

Next, a method of calculating contact intensity in the touch panel according to an exemplary embodiment of the invention will be described with reference to FIG. 18.

Figure 18:
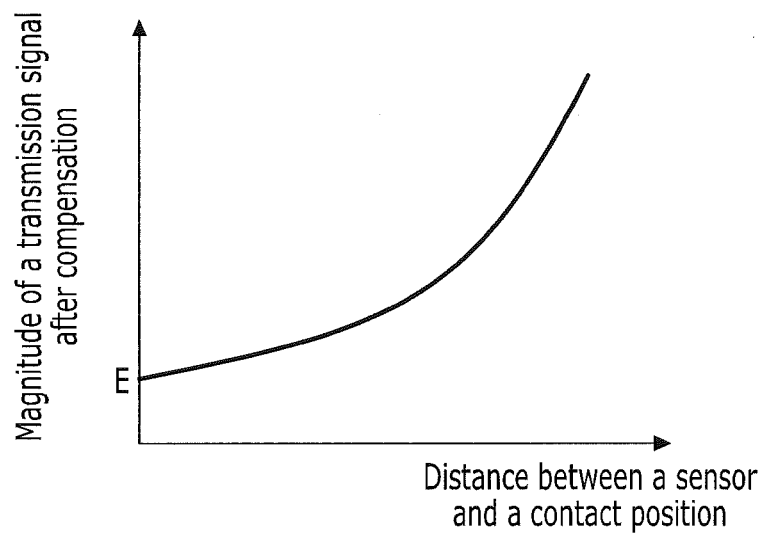
FIG. 18 is a graph illustrating an exemplary embodiment of a magnitude (Y-axis) versus time (X-axis) of a transmission signal that is compensated according to a distance between a sensor of a touch panel and a contact position according to the invention.

FIG. 18 is a graph illustrating an exemplary embodiment of a magnitude (Y-axis) versus time (X-axis) of a transmission signal that is compensated according to a distance between a sensor of a touch panel and a contact position according to the invention.

In the touch panel 100 according to an exemplary embodiment of the invention, the contact intensity may be determined by the magnitude of the sensing signal Vt or the magnitude E of the transmission signal St, and the coordinates of the contact position.

The amplitude and the magnitude of the transmission signal, which is generated when one point between the first and second sensors 120a and 120b of the transmitting member 110 is contacted, may be decreased in proportion to the square of the distance to the first and second sensors 120a and 120b. Accordingly, by using such physical characteristic, the magnitude E of the transmission signal recognized by the first and second sensors 120a and 120b may be compensated by using the distance between the first sensor 120a or the second sensor 120b and the contact position, that is, the coordinates of the contact position, thereby determining the contact intensity at the contact position.

In one exemplary embodiment, as in the graph shown in FIG. 18, the transmission signal recognized by the first sensor 120a or the second sensor 120b may be compensated to have a magnitude value that is proportional to the magnitude E of the transmission signal and the distance between the sensor 120a or 120b and the contact position. The magnitude of the compensated transmission signal may be determined as the contact intensity at the contact position. The magnitude E of the transmission signal sensed by the first sensor 120a or the second sensor 120b may be obtained from the magnitude of the sensing signal Vt. Alternatively, the contact intensity at the contact position may be determined based on the magnitude of the sensing signal Vt compensated according to the distance between the first or the second sensor 120a or 120b and the contact position instead of the magnitude of the compensated transmission signal.

The contact intensity as the contact position may be calculated for each of the contact points P1, P2, and P3 in the above-described exemplary embodiments. The calculation of the contact position is based on an assumption that the magnitude E of the transmission signal St is not affected by a signal interference and thus is only relevant to the transmission distance thereof.

As described above, according to the exemplary embodiments, the invention may easily calculate the correct contact position through simple calculation methods regardless of the number of contacts for the touch panel, and the contact intensity may be simply calculated by using the contact position. Also, the transparent transmitting member 110 having a simple structure is positioned at a touch surface such that the transmittance of the touch panel may be increased and the manufacturing cost the edge region of the touch panel may be reduced. Further, the transmitting member 110 may be flexible such that the invention may also be applied to a flexible display device.

Next, a touch panel according to another exemplary embodiment of the invention will be described with reference to FIGS. 19 through 22.

Figure 19:
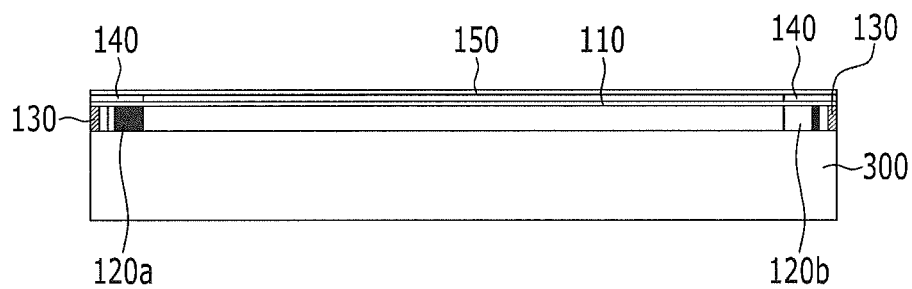
FIG. 19 is a cross-sectional view illustrating an exemplary embodiment of a touch panel according to the invention.
Figure 20:
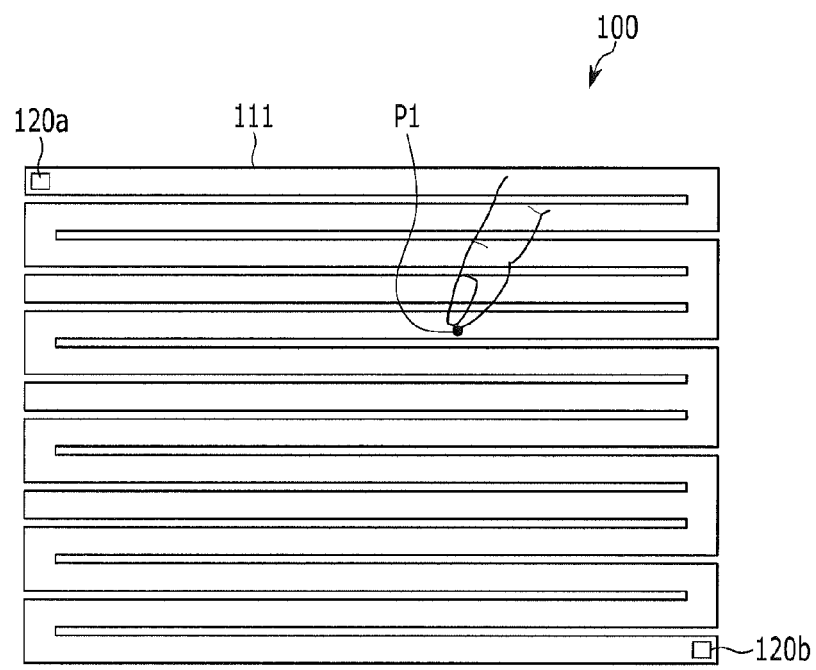
FIG. 20 is a top plan view illustrating an exemplary embodiment of a touch panel according to the invention.
Figure 21:
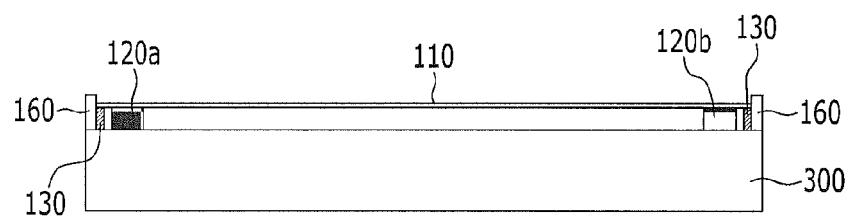
FIG. 21 is a cross-sectional view illustrating an exemplary embodiment of a touch panel according to the invention.
Figure 22:
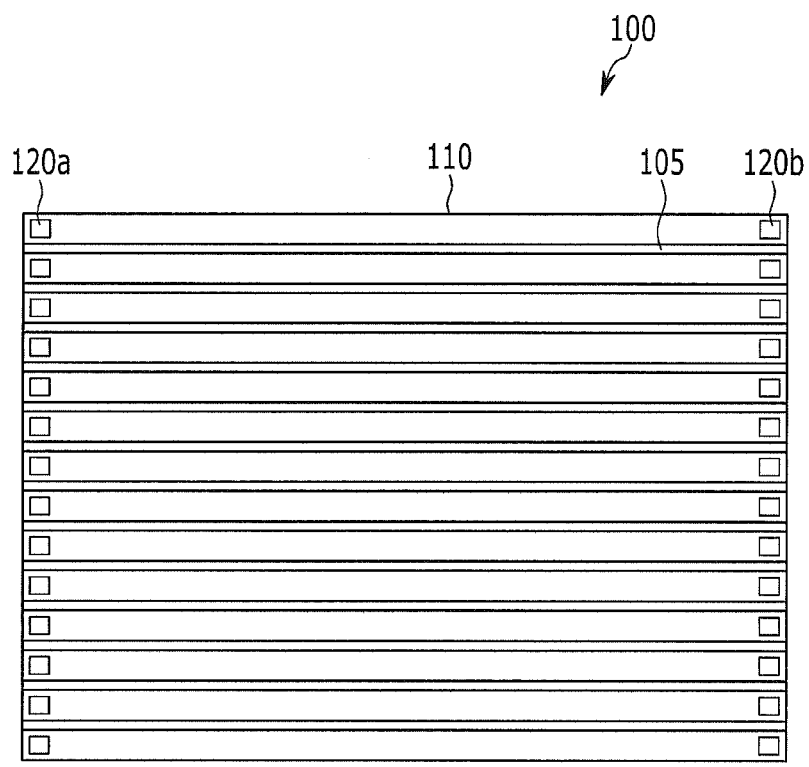
FIG. 22 is a top plan view illustrating an exemplary embodiment of a touch panel according to the invention.

FIG. 19 is a cross-sectional view illustrating an exemplary embodiment of a touch panel according to the invention, and FIG. 20 is a top plan view illustrating an exemplary embodiment of a touch panel according to the invention. Also, FIG. 21 is a cross-sectional view illustrating an exemplary embodiment of a touch panel according to the invention, and FIG. 22 is a top plan view illustrating an exemplary embodiment of a touch panel according to the invention.

Referring to FIG. 19, a touch panel according to an exemplary embodiment of the invention is substantially the same as the touch panel shown in FIG. 1 through FIG. 3, except that an adhesion member 140 and a protection film 150, positioned on a plurality of transmitting members 110, are further included.

The protection film 150 may distribute the contact pressure through the interval between the plurality of the transmitting members 110. The protection film 150 may comprise an insulating material such as, for example, glass. In one exemplary embodiment, the insulating material may be transparent. The layer between the protection film 150 and the transmitting member 110 may be filled with a gas such as, for example, air.

The adhesion member 140 may fix the protection film 150 to the touch panel 100 including the plurality of the transmitting members 110.

Next, referring to FIG. 20, the touch panel according to an exemplary embodiment includes at least one transmitting member 111 that is bent at at least one portion thereof and at least a pair of first and second sensors 120a and 120b positioned under first and second terminals of the transmitting member 111. The transmitting member 111 may be bent at several portions thereof to form a serpentine shape (e.g., "S"-shape), and the first and second sensors 120a and 120b are positioned at, for example, both ends of each transmitting member 111 to be opposed to each other in a diagonal direction. The transmitting member 111 of the touch panel according to the exemplary embodiment may be formed by alternately connecting left side terminals and right side terminals of neighboring transmitting members among the plurality of the transmitting members 110 in FIG. 1.

The touch panel shown in FIG. 20 includes one transmitting member 111, however the invention is not limited hereto, and two or more transmitting members 111 may be included. In this case, each transmitting member 111 may include a pair of the first and second sensors 120a and 120b.

Two transverse portions of the transmitting member 111 that are connected to each other at one end may be separated from each other by a predetermined interval. The first sensor 120a and the second sensor 120b may be respectively positioned under one end of the two transverse portions, positioned at the top and bottom of the transmitting member 111. In other words, the first sensor 120a may be positioned under one end of the transverse portion positioned at the top of the transmitting member 111 and the second sensor 120b is positioned under one end of the transverse portion positioned at the bottom of the transmitting member 111.

In the exemplary embodiment, the contact position of the contact point P1 may be calculated by using a path through which the sensing signal Vt travels to reach the first and second sensors 120a and 120b, which can be obtained by using a temporal position of the sensing signal Vt with respect to the first and second sensors 120a and 120b. The path leading from the contact point P1 to the first sensor 120a or the second sensor 120b is a bent path in accordance with a bent shape of the transmitting member 111. Also, the contact intensity may be calculated by using the magnitude E of the sensed transmission signal St. According to the exemplary embodiment, the number of the transmitting members 111 and the sensors 120a and 120b for transmitting the transmission signal may be greatly reduced, thereby reducing manufacturing cost of the touch panel.

Next, referring to FIG. 21, the touch panel according to an exemplary embodiment is substantially similar to the touch panel according to the exemplary embodiment shown in FIG. 1 to FIG. 3 except that a wave absorption member 160 positioned at first and second terminals of the transmitting member 110 may be further included. The wave absorption member 160 may be formed to have a contact with the transmitting member 110. The wave absorption member 160 is used to absorb the transmission signal St transmitted through the transmitting member 110 such that the transmission signal St, reflected at the edge of the touch panel 100, may be prevented from returning to the transmitting member 110.

Next, referring to FIG. 22, the touch panel according to an exemplary embodiment is substantially similar to the touch panel according to the exemplary embodiment shown in FIG. 1 to FIG. 3, except that an absorption member 105 positioned between the plurality of the transmitting members 110 may be further included. The absorption member 105 is used to absorb the transmission signal transmitted by each transmitting member 110 to ensure that the transmission signal is not transmitted to the neighboring transmitting member 110. The absorption member 105 may fill the interval between the neighboring transmitting members 110 and may be transparent. Accordingly, an upper surface formed by the plurality of the transmitting members 110 and absorption members 105 may be evenly flat without protrusions or recession. The plurality of the transmitting members 110 and the absorption members 105 may be positioned on the same layer in a multi-layered structure.

In the touch panels of the several above-described exemplary embodiments, the sensors 120a and 120b may calculate the contact information such as the number of contact points, the contact position, and the contact intensity; however, it should be noted that the invention can further include a determining unit for determining the above contact information based on the sensing signal Vt received from the sensors 120a and 120b. While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A touch panel comprising:
a plurality of transmitting members arranged with a predetermined interval therebetween;
a first sensor and a second sensor positioned respectively at a first terminal and a second terminal of a transmitting member, and
a wave absorption member positioned at the first and second terminals of the transmitting member,
wherein a transmission signal is transmitted to the first sensor and the second sensor, respectively, in response to a contact on the transmitting member.

2. The touch panel of claim 1, wherein
the transmitting member is flexible, and
the transmission signal comprises a material wave.

3. The touch panel of claim 2, wherein
at least one of the first sensor and the second sensor generates a sensing signal corresponding to a contact pressure.

4. The touch panel of claim 3, wherein
at least one of the first sensor and the second sensor includes a reference resistor and a sensing resistor coupled in series between a first voltage and a second voltage, and
the sensing signal is output at a node between the reference resistor and the sensing resistor.

5. The touch panel of claim 4, wherein
a resistance of the sensing resistor is variable according to a magnitude of the transmission signal.

6. The touch panel of claim 5, wherein
a magnitude of the sensing signal is proportional to the magnitude of the transmission signal.

7. A touch panel comprising:
a plurality of transmitting members arranged with a predetermined interval therebetween; and
a first sensor and a second sensor positioned respectively at a first terminal and a second terminal of a transmitting member,
wherein
a transmission signal is transmitted to the first sensor and the second sensor, respectively, in response to a contact on the transmitting member,
at least one of a number of a first sensing signal generated by the first sensor and a number of a second sensing signal generated by the second sensor determines a number of a contact position to the touch panel,
at least one of a temporal position of the first sensing signal and a temporal position of the second sensing signal determines a coordinate of the contact position, and
at least one of a magnitude of the first sensing signal and a magnitude of the second sensing signals and the coordinate of the contact positions determines a contact intensity.

8. The touch panel of claim 7, wherein
when it is determined that neighboring transmitting members are simultaneously contacted by the first and the second sensors of corresponding neighboring transmitting members, an average of coordinates of the corresponding transmitting members, each of which is determined based on the at least one of the temporal position of the first sensing signal and a temporal position of the second sensing signal, is output as the coordinate of the contact position.

9. The touch panel of claim 1, further comprising:
a first support positioned at the first terminal of the transmitting member and positioned outwardly from the first sensor; and
a second support positioned at the second terminal of the transmitting member and positioned outwardly from the second sensor.

10. The touch panel of claim 1, further comprising:
a protection film positioned on the transmitting member.

11. A touch panel comprising:
a plurality of transmitting members arranged with a predetermined interval therebetween; and
a first sensor and a second sensor positioned respectively at a first terminal and a second terminal of a transmitting member, wherein
a transmission signal is transmitted to the first sensor and the second sensor, respectively, in response to a contact on the transmitting member,
the plurality of the transmitting members are connected to each other alternately at a left terminal or a right terminal thereof, and
the first sensor and the second sensor are respectively positioned at first or second terminals of first and second transmitting members connected to each other, the first transmitting member being positioned at a top portion and the second transmitting member being positioned at a bottom portion.

12. A touch panel comprising:
a plurality of transmitting members arranged with a predetermined interval therebetween;
a first sensor and a second sensor positioned respectively at a first terminal and a second terminal of a transmitting member; and
an absorption member positioned between the plurality of the transmitting members,
wherein a transmission signal is transmitted to the first sensor and the second sensor, respectively, in response to a contact on the transmitting member.

13. A method of determining contact information in a touch panel including a plurality of transmitting members that are arranged with a predetermined interval therebetween, and a first sensor and a second sensor respectively positioned at a first terminal and a second terminal of a transmitting member, the method comprising:
sensing a transmission signal transmitted by the transmitting member, using the first sensor and the second sensor, respectively;
generating a first sensing signal and a second sensing signal based on the sensed transmission signal;
determining a number of a contact position on the transmitting member based on the first sensing signal and the second sensing signal;
determining a coordinate of the contact position by using a temporal position of the first sensing signal and a temporal position of the second sensing signal; and
determining a contact intensity based on at least one of a magnitude of the first sensing signal and a magnitude of the second sensing signal and the coordinate of the contact position.

14. The method of claim 13, wherein,
when the number of the contact position is at least two,
the determining of the coordinate of the contact position includes respectively calculating a coordinate of at least two contact positions.

15. The method of claim 13, wherein,
when the number of the contact position is at least two,
the determining of the coordinate of the contact position includes:
calculating a coordinate of a reference position among at least two contact positions; and
calculating a distance between the reference position and other contact position among the at least two contact positions.

16. The method of claim 13, further comprising:
determining a first axis coordinate of a contact position based on a temporal position of the first sensing signal and a temporal position of the second sensing signal; and
determining a second axis coordinate of the contact position based on a position of the transmitting member where the transmission signal is generated.

17. The method of claim 16, wherein
when it is determined that neighboring transmitting members are simultaneously contacted, an average of coordinates of corresponding transmitting members is output as a coordinate of the contact position.

18. A method of determining a contact position in a touch panel including a plurality of transmitting members, each of which extending in a first direction and being arranged in a second direction to have a predetermined interval therebetween, and a sensor positioned at each transmitting member, the method comprising:
measuring a time period required for a touch signal to reach the sensor, wherein the touch signal is generated in response to a contact pressure applied to a transmitting member;
determining a first coordinate of the contact position along the first direction based on the measured time period, wherein the sensor is a reference point for the first coordinate;
determining a second coordinate of the contact position based on a position, along the second direction, of the transmitting member to which the contact pressure is applied,
wherein a wave absorption member is positioned at first and second terminals of the transmitting member.

* * * * *